United States Patent

Kalopissis et al.

[15] 3,693,633

[45] Sept. 26, 1972

[54] WAVING HAIR WITH A WATER SOLUBLE THIOL CHAIN CONTAINING POLYMER AND A WATER SOLUBLE DISULFIDE

[72] Inventors: Gregoire Kalopissis, Paris; Andre Viout, Montreuil, both of France

[73] Assignee: Societe anonyme dite L Oreal, Paris, France

[22] Filed: May 11, 1970

[21] Appl. No.: 36,398

[30] Foreign Application Priority Data

Apr. 18, 1963 Austria..................3150/63

Related U.S. Application Data

[63] Continuation-in-part of Ser. No. 360,730, April 17, 1964, abandoned.

[52] U.S. Cl. .......................132/7, 8/127.51, 424/71, 424/72

[51] Int. Cl. ..............................................A45d 7/06

[58] Field of Search .......132/7; 424/72, 71; 8/127.51

[56] References Cited

UNITED STATES PATENTS

| | | | |
|---|---|---|---|
| 2,717,228 | 9/1955 | Brown | 424/72 |
| 2,719,813 | 10/1955 | Haefele | 424/72 |
| 2,719,814 | 10/1955 | Haefele | 424/72 |
| 2,719,815 | 10/1955 | Sanders | 424/72 |
| 2,944,942 | 7/1960 | Charle et al. | 424/72 |
| 2,963,405 | 12/1960 | Seemuller | 424/72 |
| 3,111,512 | 11/1963 | Benesch et al. | 424/72 X |
| 3,247,067 | 4/1966 | Miskel et al. | 424/72 |

*Primary Examiner*—Albert T. Meyers
*Assistant Examiner*—Vera C. Clarke
*Attorney*—Holcombe, Wetherill & Brisebois

[57] ABSTRACT

An aqueous solution containing (a) a water soluble polymer having thiol chains that remain bound to the polymer in solution and (b) a water soluble disulfide. The process of shaping keratinic fibers by applying to the keratinic fibers said polymer composition and shaping the fibers to the desired shape. Keratinic fibers coated with polydisulfides derived from said composition.

9 Claims, No Drawings

WAVING HAIR WITH A WATER SOLUBLE THIOL CHAIN CONTAINING POLYMER AND A WATER SOLUBLE DISULFIDE

This application is a continuation-in-part of application Ser. No. 360,730, filed Apr. 17, 1964, which has been abandoned in favor of this application.

Mercaptans, and particularly thioglycolic acid have been used for a long time in ammoniacal solutions to reduce the S—S linkages in keratin so as to plastify the hair, after which the disrupted linkages are oxidized to reconstitute the fibers.

This process of permanently waving hair, which has been improved in many ways, is still open to the objections that it weakens the hair and must be carried out in two steps, to wit, the reducing step and then the "oxidizing" or "neutralizing" step.

The present invention relates to a new method of treating keratinic fibers which is characterized by the fact that it may be carried out in a single step, and has no weakening effect on the hair.

The present invention is an improvement on a prior invention not heretofore disclosed, which consists in utilizing, instead of the thiols having a low molecular weight heretofore employed to permanently wave hair, polymers soluble in aqueous solutions which contain mercapto groups in their molecular chains. The S—S linkages of the keratin treated are thus reduced by the polymercapto polymer, after which the polydisulfide polymers produced by said reduction are deposited in the keratinic fibers.

The present invention is based on the discovery that the efficacy of the action of these polymercapto polymers may be increased by associating them with an unpolymerized disulfide.

The object of the present invention is to provide a new process for treating keratinic fibers and especially hair, this process being essentially characterized by the fact that the keratinic fibers are impregnated with a solution comprising in combination polymers having thiol groups fixed on their chains and more or more unpolymerized disulfides.

A further object of the present invention is to provide a new article of manufacture consisting of a composition for treating keratinic fibers, which composition is essentially characterized by the fact that it comprises in combination polymers having thiol groups attached to their chains which remain attached in aqueous solution and at least one unpolymerized disulfide.

Among the polymercapto polymers which are particularly useful in carrying out the present invention are those which correspond to the following general formula:

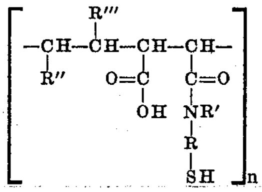

in which formula R is an alkylene preferably comprising from two to four carbon atoms, which may be substituted by lower alkyl groups which may have up to four carbon atoms, a carboxyl group or a carbalkoxy group, R'' and R''' are hydrogen, lower alkyl having one to six carbon atoms, phenyl or lower alkoxy group having one to six carbon atoms, and R'' and R''' being either identical or different, R' represents hydrogen or a lower alkyl having one to six carbon atoms such as $CH_3$, $C_2H_5$, and n is an integer greater than 1 and less than 25.

The molecular weight of these polymers is generally less than 6,000; moreover they should be soluble in water at least at basic pH values.

The unpolymerized disulfides which may be used in combination with the polymercapto polymers are soluble in the aqueous solution and have the general formula R S S R', in which formula R and R' may be identical or different and represent lower alkyls substituted by solubilizing groups such as —COOH, —OH, —$NH_2$, which may themselves be either substituted or unsubstituted.

In order for these disulfides to be suitable for use in carrying out the invention, it suffices for them to be soluble in water at the pH of use, and that the thiols which they yield be capable of having the required effect on the —S-S— linkages of the keratin.

Such disulfides include dithiodiglycolic acid, dithiodilactic acid, dithiodipropionic acid, cystine, the dithiodiglycolate of glycol and the dithiodiglycolate of glycerol.

In carrying out the invention, it is preferable to mix the two constituents in the ratio of one mol of disulfide for each two SH groups of the polymer. This ratio is not, however, essential, and it is possible to depart from it rather substantially without thereby departing from the basic principles of the invention.

The disulfides should preferable be added to the solution of polymercapto polymers at the moment of use, and may be added in the form of an aqueous solution, or in the form of a powder, depending on the physical characteristics of the product added.

The mixture of mercapto polymer and disulfide should preferably be used at a pH between about 8.5 and 9.5. Any pH in which the polymers are soluble in the solution can be used. Some polymers will be soluble in solutions which have an acid pH but they are more soluble in solutions which have a basic pH.

In order to obtain this pH it is preferred to use ammonia or organic amines such as monoethanalomine, morpholine, etc.

It is also possible to add to the composition for treating keratinic fibers those swelling or penetrating agents which are customarily used when treating hair with permanent waving liquids, for example, urea and acetamide, etc. and other solvents which increase the solubility of the polymers in aqueous solution, such as an ethyl alcohol, propyl alcohol, etc.

While it is not intended that the following explanations should be considered to constitute a definition of the invention to which its scope should be limited, it has been determined by research carried out by applicant that the action of the mixture of the polymercapto polymer and the unpolmerized disulfide may be explained in the following manner.

To facilitate this explanation, the keratin of the hair will be represented by the formula K S S K, in which K represents the peptide chains of the keratin, which are indicated by the letter K, it being understood that these chains are not in practice identical, but have analagous structures. The reduced keratin is represented by the formula K S H.

The disulfides used in carrying out the invention are represented by the formula R S S R in which R is a lower alkyl which may be identical or different in the same molecule of disulfide. The formula R S H represents the thiol or thiols which the disulfides R S S R may produce.

Finally, the polymercapto polymers used in carrying out the invention are represented by the formula (P S H)$_n$, or simply by the formula P S H, in which formulas P represents the polymeric skeleton of the polymer. P S S P indicates the polydisulfide polymer.

It is known that the chemical reactions which take place during the permanent waving of hair may be schematically represented by the following formulas:

$$KSSK + 2RSH \leftrightarrows 2KSH + RSSR \quad (II)$$

This reaction makes it possible to first plastify the hair by forming reduced keratin K S H, and then reconstitute the K S S K linkages in other positions during oxidation.

Moreover, the polymercapto polymer, when treated with a disulfide, reacts as follows:

$$2PSH + RSSR \leftrightarrows PSSP + 2RSH \quad (III)$$

By comparing the two formulas II and III, it will be seen that the disulfide R S S R formed during the reduction of the keratin by the thiol combines with the polymercapto polymer P S H to not only form a polydisulfide polymer which is deposited in the fiber but also regenerates the thiol R S H which was initially used to reduce the keratin.

It will then be seen that by using a mixture of polymercapto polymers and disulfides, in accordance with the invention, the thiol formed by the disulfide is automatically regenerated.

A substantial deposit of polydisulfide polymer on and in the keratinic fibers is also obtained.

When used in permanently waving hair the deposit of this disulfide polymer on and in the hair takes place in quantities sufficient to make it possible to dispense with the second "oxidizing" or "neutralizing" step, without inconvenience, even though this step is essential in almost all hair waving processes heretofore used.

In other words, the reconstitution of the hair resulting from the deposit of the polydisulfide polymers is such that after having treated the hair wound up on rollers with the mixture of polymercapto and disulfide polymers, it is possible, without further precaution, to rinse the hair, remove the rollers, and dry the hair. The reconstitution of the —S—S— linkages of the keratin will take place later and spontaneously by oxidation from the air, while the hair is kept in its new shape by the action of the polymercapto polymers alone.

It will thus be seen that the product according to the invention offers three advantages when used to permanently wave hair:

1. The —S—S— linkages of the hair are reduced by thiol in its nascent state, after which it is permanently regenerated by the disulfide, the action of the thiol under such conditions being much more efficacious.
2. Thanks to the deposit of polydisulfide polymer in the fiber, the neutralizing step may be dispensed with, since neutralization results spontaneously from contact with the oxygen in the air.
3. The process of permanently waving the hair according to the invention has no adverse effect on the hair and may even be used to reconstitute it, since the deposit of a by no means negligeable quantity of polydisulfide polymers in the fiber compensates very largely for the weakening which results from a chemical permanent waving process.

In order that the invention may be better understood several methods of carrying it out will now be described, purely by way of illustration, without limiting the scope of the invention to the details thereof:

EXAMPLE 1

A mercapto polymer designated "Polymer A" is prepared in the following manner:

50.5 grams, or 0.25 moles, of styrene/maleic anhydride copolymer, in which the number "n" is equal to 8, (a copolymer known commercially as Resin SMA 1000 A of the Texas Butadiene Chemical Corporation), is dissolved in 200 cc of anhydrous acetone. This product is stated to have a styrene monomer-maleic anhydride ratio of 1:0.9. To this solution at room temperature and under a nitrogen atmosphere, 0.225 moles of hydrochloride of βmercapto-ethylamine are added. The 0.225 moles of triethylamine in solution in 50 cc of acetone are added slowly, while keeping the temperature between 15° and 20° C. The mixture is then boiled for three hours. The hydrochloride of triethylamine thus formed is drained after cooling and then washed with a little acetone.

The acetonic filtrate is evaporated until dry under a reduced pressure and a nitrogen atmosphere. The residue thus obtained is purified by dissolving it in a 10 percent soda solution and reprecipitated after draining, using a dilute solution of hydrochloric acid. Sixty grams of the desired mercapto polymer is obtained in the form of a white powder, which is then vacuum dried.

ANALYSIS

The product obtained in this manner was subjected to the following tests (The mercapto group is calculated on the basis of a styrene monomermaleic anhydride ratio of 1:0.9.) Determination of mercapto group:

| (a) SH % calculated | SH % found |
|---|---|
| 10.62 | 5.07 |

(b) SH after reduction of the oxidized form which may be found in the product:

| SH % calculated | SH % found |
|---|---|
| 10.62 | 6.25 |

It clearly follows from these determinations that the polymer obtained comprises a large proportion of mercapto functions in the free state.

An aqueous solution is prepared having the following composition:

| | |
|---|---|
| Polymer A having a 50% transformation ratio | 15 g (0.03 moles) |
| 20% ammonia solution | 5 cc |
| Water, q.s.p. | 65 cc |

The pH of this solution is 9.5.

Another solution is prepared having the following composition:

| | |
|---|---|
| Dithiodiglycolic acid | 2.75 g (0.015 moles) |
| 20% ammonia solution | 6 cc |
| Water, q.s.p. | 35 cc |

The pH of this solution is 9.5.

At the moment of use these two solutions are mixed. The hair to be treated is rolled lock by lock on the permanent waving rollers after each lock has been impregnated with the solution obtained in the manner just described.

When the rolling has been completed, each lock is saturated with the same solution and left in contact with the hair at the ambient temperature for 10 to 15 minutes, after the head has been covered with a hood.

External heat may be applied, using apparatus of a conventional type, in which case the time of application is only 7 to 12 minutes.

The hair which has been thus treated is first rinsed while still rolled up. Then it is unrolled and again rinsed.

After the hair has been dried, a permanent wave of good quality is obtained having a strength comparable to that obtained by conventional methods which, as is well known, comprise a supplemental fixing step using an oxidizing agent such as hydrogen peroxide.

EXAMPLE II

A solution having the following composition is prepared:

| | |
|---|---|
| Mercapto polymer A, such has been described in the previous example | 15 g (0.03 moles) |
| 20% ammonia solution | 10 cc |
| Water, q.s.p. | 100 cc |

At the moment of use 5 g (0.03 moles) of dithiodiglycolic acid is added to this solution in powder form, and the resulting solution is applied in the same way described in Example I.

This produces a permanent wave having characteristics comparable to those of the previous example.

EXAMPLE III 6.5 grams of cystine are added to the solution of polymercapto polymer described in Example I. The final pH of the solution is then adjusted to 9.5 by adding ammonia.

The hair is treated as in EXample I and a comparable wave is obtained.

EXAMPLE IV

The process is carried out as in Example III, but instead of adding dithiodiglycolic acid to the initial solution, 9 g of dithiodiglycolate of glycerol is added. The solution is applied in the same way and the results obtained are equally satisfactory.

EXAMPLE V

Six percent of urea is added to the aqueous solution obtained as in Example I, and this solution is applied to the hair in the manner described in that example. This results in a permanent having a slightly greater waving power because of the presence of urea, which acts as a swelling agent.

EXAMPLE VI

A polymercapto polymer hereinafter referred to as polymercapto polymer B is prepared in the following manner:

6.5 g (0.162 moles) of soda are dissolved in 60 ml of water. This is heated to 20° C, after which 19 g (0.168 moles) of β-mercaptoethylamine hydrochloride are added. The temperature is kept at 20° C while adding in small quantities 12.6 g of the maleic anhydride/ethylene copolymer having a specific viscosity of 0.1 in a 1 percent solution of the resin in dimethyl formamide at 25°C, sold commercially as "Resin DX 840–11" by the Monsanto Massachusetts Corporation. In this product (DX 840–11) the ethylene monomer-maleic anhydride ratio is 1:0.81.

When the addition has been completed 25 ml of 40 percent soda is added and the polymercapto polymer is precipitated by acidification with a concentrated solution of hydrochloric acid.

The product obtained may be further purified by redissolving it in an alkaline (soda) solution and reprecipitating it in an aqueous solution of hydrochloric acid. This yields an elastic mass which is vacuum dried.

Yield: 75 percent

ANALYSIS

The product obtained in this way was subjected to the following tests (The mercapto group is calculated on the basis of an ethylene monomer/maleic anhydride ratio of 1:0.81.)

Determination of SH concentrations:

a) SH %

| | |
|---|---|
| Calculated | 14.25 |
| Founded | 8.75 |

b) After reduction of the oxidized form eventually present in the product

SH %

| | |
|---|---|
| Calculated | 14.25 |
| Founded | 9.5 |

An aqueous solution having the following composition is then prepared:

| | |
|---|---|
| Polymercapto polymer B having a transformation ration of 65–70% | 12 g |
| Urea | 6 cc |
| 20 % ammonia solution q.s.p. pH 9.5 | |
| Water, q.s.p. | 65 cc |

Besides, a second aqueous solution is prepared having the following composition:

| | |
|---|---|
| dithiodiglycolic acid | 5 g |
| 20% ammonia solution q.s.p. pH 9.5 | |
| Water, q.s.p. | 35 cc |

The two solutions are mixed just before application to the hair as described in Example I, and after drying, without recourse to a second oxidizing or neutralizing step, a permanent wave is secured which stands up well under humid conditions.

EXAMPLE VII

A polymercapto polymer hereinafter referred to as polymercapto C is prepared in the following manner:

20.2 grams, 0.1 gram-molecule of the unit structure of the maleic anhydride/styrene copolymer, in which the number *n* is equal to 8 (a copolymer which is commercially known as resin SMA 1000 A of the Texas Butadiene Chemical Corp) is dissolved in 150 ml of anhydrous acetone. This product is given as having a styrene monomer/maleic anhydride ratio of 1 : 0.9. 0.9 gram-molecules of cysteine hydrochloride are added to this solution at room temperature and under a nitrogen atmosphere. Then 0.9 gram-molecules of triethylamine in solution in 50 cc of acetone is added slowly, while keeping the temperature between 15° and 20° C and the mixture is then boiled for 3 hours. The triethylamine hydrochloride thus obtained is drained after cooling, and washed with a little acetone.

The acetonic filtrate is evaporated until dry under a nitrogen atmosphere at a sub-atmospheric pressure. The residue thus obtained is purified by dissolving it in a 10 percent solution of NaOH and reprecipitating it, after drying, by means of a dilute solution of hydrochloric acid. Twenty-four grams of the desired polymer are thus obtained in the form of a white powder, which is then vacuum dried.

ANALYSIS

The product thus obtained is subjected to the following tests (The sulfhydryl group is calculated on the basis of styrene monomer/maleic anhydride ratio of 1 : 0.9):

Determination of sulfhydryl group content:

| | |
|---|---|
| a) SH % calculated | SH % found |
| 9.57 | 2.5 |
| b) SH after reduction of the oxidized form eventually present in the product | |
| SH % calculated | SH % found |
| 9.57 | 2.61 |

An aqueous solution having the following composition is then prepared:

| | |
|---|---|
| polymercapto polymer C having a 27.3% transformation ratio | 7 g |
| urea | 7 g |
| 20% ammonia solution q.s.p. pH 9.5 | |
| water, q.s.p. | 66 cc |

Besides, a second aqueous solution is prepared having the following composition:

| | |
|---|---|
| Dithiodiglycolic acid | 1.2 g |
| 20% ammonia solution q.s.p. pH 9.5 | |
| water, q.s.p. | 34 cc |

At the moment of use these two solutions are mixed as described in Example I and after drying without recourse to a second oxidizing or neutralizing step, a permanent wave is secured which stands up well under humid conditions.

It will of course be appreciated that the scope of the invention is not limited to the specific examples which have been described, which may be modified as to detail without thereby departing from the basic principles of the invention.

What is claimed is:

1. A composition for treating hair comprising an aqueous solution having a basic pH containing effective amounts of a water soluble polymer which has side chains which have a terminal thiol group which can react with disulfide groups and a water soluble disulfide, said water soluble polymer having the following formula:

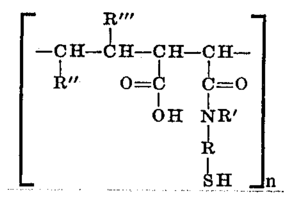

in which R is an alkylene group having two to four carbon atoms which may be substituted by a carboxyl group, R'' and R''' are selected from the group consisting of hydrogen, and phenyl, R' is hydrogen and *n* is an integer greater than 1 and less than 25.

2. The composition of claim 1 in which the molecular weight of said polymer is less than 6,000.

3. The composition of claim 1 in which said disulfide is selected from the group consisting of dithiodiglycolic acid and dithiodiglycolate of glycerol.

4. The composition of claim 1 in which said disulfide and said polymer are in the proportion of at least 1 mol of disulfide for each two polymer thiol groups.

5. The composition of claim 1 having a pH between 8.5 and 9.5.

6. The composition of claim 5 which also contains a substance taken from the group consisting of ammonia and organic amines.

7. The process of treating hair which comprises applying to the hair an effective amount of the composition of claim 1 for about 5 to 20 minutes, and subsequently washing the hair.

8. The process of permanently waving hair comprising applying to the locks of hair a permanent waving amount of the composition of claim 1, winding said locks of hair on rollers, again impregnating said locks with said composition, leaving the hair rolled while the solution reacts for about 5 to 20 minutes, removing the hair from the rollers, and rinsing and drying the hair.

9. The process of claim 8 comprising the step of heating the rollers on which the hair is wound.

* * * * *